April 17, 1928. 1,666,712
G. E. MANCOS
INNER TUBE TESTER
Filed Nov. 23, 1926  2 Sheets-Sheet 1
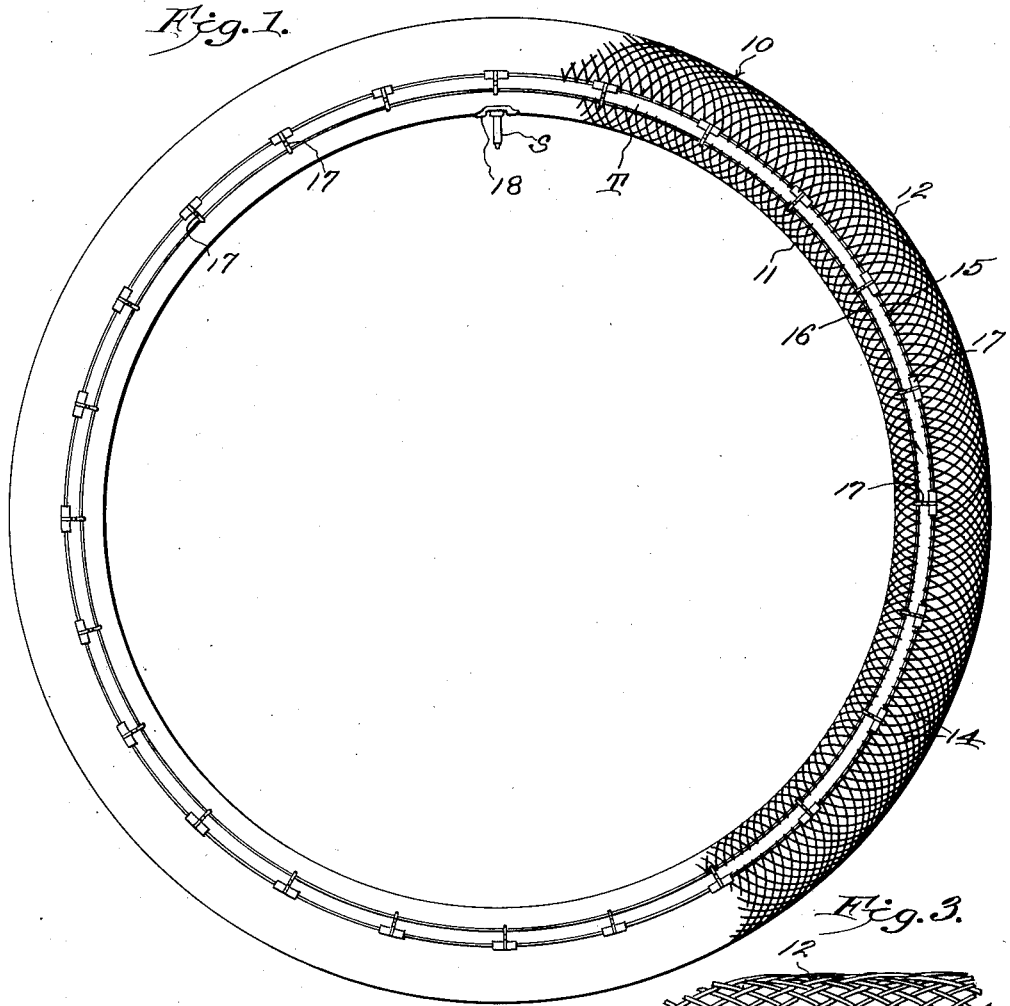
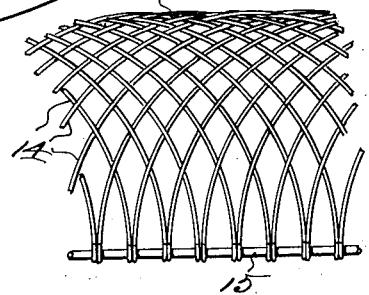
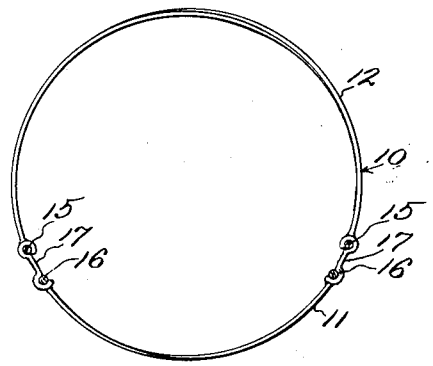

April 17, 1928.
G. E. MANCOS
INNER TUBE TESTER
Filed Nov. 23, 1926
1,666,712
2 Sheets-Sheet 2
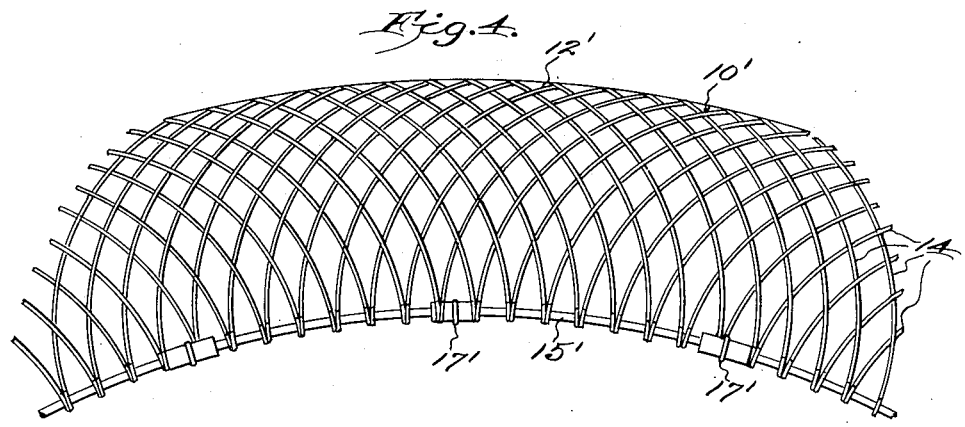
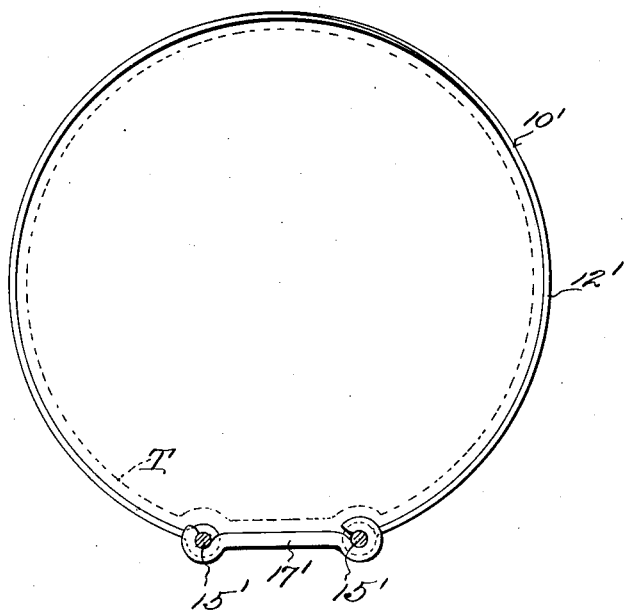

Patented Apr. 17, 1928.

1,666,712

UNITED STATES PATENT OFFICE.

GEORGE E. MANCOS, OF RICHMOND, VIRGINIA.

INNER-TUBE TESTER.

Application filed November 23, 1926. Serial No. 150,287.

This invention relates to certain improvements in inner-tube testers; and the nature and objects of the invention will be readily recognized and understood by those skilled in the art in the light of the following explanation and detailed description of the accompanying drawings illustrating what I, at present, consider to be the preferred embodiments or mechanical expressions of my invention from among various other forms, arrangements, combinations and constructions of which the invention is capable within the spirit and scope thereof.

The invention is particularly directed to the solution of certain problems and the elimination of certain disadvantages encountered in the operation and the use of inner-tubes of pneumatic tires for vehicles, such for example as automobile tires and the like. It is found in practice that frequently the inner-tube of a tire is so minutely punctured or pierced as to form a very slow leak exceedingly difficult to detect by the usual methods. With an inner-tube having a small or minute slow leaking puncture, when the tube is removed from the tire, it is customary to inflate the same under slight pressure and to immerse the slightly inflated tube in a body of water, in order to detect through the medium of the air bubbles in the water, the presence and location of a leak. However, where the tube has a very small puncture, this method will not suffice to locate the same, because it is generally found impossible to place the tube, when removed from the tire, under sufficiently high pressure to cause the escape of air through such minute puncture, without either bursting the tube or causing the tube to bulge or expand at one point therein. Therefore, one of the main and fundamental objects of my present invention, is to provide a device or means for holding a tire tube when removed from a tire for testing which will enable the inflation of the tube under sufficient pressure to cause leakage of air through a minute or small puncture without the danger of bursting the tube or having the same bulge at one particular point.
A further object of the invention is directed to the provision of a mechanically simple holder for testing an inner-tube under pressure, which holder will expose to view an inner-tube disposed therein and will permit passage of escaping air therethrough, while holding the tube against bursting or against bulging at any point or points and thereby permit inflation under sufficiently high pressure, so that the holder and tube can be immersed in a body of water and the leak thereby readily detected and located.

A still further object of the invention is to provide an inner-tube tester which can be readily manufactured at relatively small cost and which is so designed that an inner-tube can be quickly inserted for testing therein and removed therefrom after testing.

With the foregoing general objects, and certain other objects and results in view, which other objects and results will be readily apparent from the following description, the invention consists in certain novel features in construction and in combinations and arrangements of parts as will be more fully and particularly referred to hereinafter.

Referring to the accompanying drawings in which similar reference characters refer to corresponding parts throughout the several figures thereof, Fig. 1 is a side elevation of an inner-tube tester embodying my invention and showing an inner-tube inflated therein for testing.

Fig. 2 is a transverse vertical section through the tester of Fig. 1.

Fig. 3 is a detailed view in elevation showing the formation and construction of the material of which the tester is formed.

Fig. 4 is a view in side elevation of a portion of a modified form of the tester of the invention.

Fig. 5 is a transverse section through the form of tester of Fig. 4.

Several possible forms and embodiments of which the invention is capable, are disclosed in the accompanying drawings and described herewith purely by way of example and not of limitation, for the purpose of explaining the principles and various features of the invention to enable those skilled in the art to understand the same. However, it is to be understood as will be readily apparent, that the invention is not restricted to the exact constructions of the examples hereof, or to the materials from which these examples are formed, but is capable of a variety of mechanical expressions formed from and constructed of any of a variety of materials, and such forms and materials are contemplated by and included within the present invention.

In the form of the invention disclosed in Figs. 1 to 3 of the accompanying drawings, the inner-tube tester embodies the annular casing or holder 10, circular or tubular in cross section as shown by Fig. 2, and formed of the complementary and concentric inner and outer sections 11 and 12, removably secured and connected together. Each section 11 and 12, of the holder or casing 10, is, in the present instance formed of the wire screening or netting 14 (see Fig. 3) of any desired or suitable size or shape of mesh, so as to form throughout and completely over and around the surface area of the holder, a casing having a series of holes or openings through which a tube mounted and confined therewithin is exposed to view, and for passage of air from the tube through the casing at any point there around. The holder or casing 10 is formed of a diameter and circumference, as well as cross section at area, to permit of inner-tubes being placed therein and received and held thereby under inflation, and if desired or found expedient holders or casings 10 of different sizes can be provided for use with different size tubes.

Each section 11 and 12 of the casing 10 is provided along its open, free edges with suitable beads or rings or wire or other desired material, the outer section 12 with the beads or rings 15, and the inner section with the beads or rings 16. At spaced intervals along the beads or rings 15 of the outer section 12, the fastening members, in the present instance in the form of the pivotally or swingably mounted hooks 17, preferably outwardly swingable as shown, although not so limited, are provided for releasably or removably engaging the opposed and adjacent beads or rings 16 of the inner or closure section 11 of the casing or holder 10, to secure the sections in position forming the complete casing or holder. At any suitable or desired point on the inner circumference of inner section 11, a fitting or member 18 (see Fig. 1) is provided to form an opening in and through which the inner-tube valve stem S is received and extends.

With an inner-tube tester in the form of the invention shown by Figs. 1 to 3 of the accompanying drawings, which it is desired to test a tube for a leak, such as a minute puncture of the slow leak type, the fastenings or hooks 17 carried by the beads 15 of the outer section 12, are swung outwardly from engagement with the beads or rings 16 of inner section 11, thus releasing the sections and permitting them to be separated to open outer section 12 for insertion of a tube. The tube T to be tested is then inserted in and between the sections 11 and 12, with the tube valve stem S received in and extending through fitting 18, and the sections are brought together into opposed, casing forming position and secured in such position by the hooks 17 engaging inner section beads or rings 16, as clearly shown by Fig. 1 of the drawings in particular. The tube T is now held and confined within the casing or holder 10, and is next inflated to the desired or necessary pressure to cause leakage or passage of air through a minute or small puncture in the tube, but due to the holder the tube is held at even point and throughout its surface area, so that equal distribution of the pressure results and the possibility of bursting the tube is eliminated.

The casing or holder 10 with and confining the inflated tube T therein can then be immersed in a body of water in the usual or customary manner followed in testing tubes for leaks, and the leak detected and located by the air bubbles formed in the water. Due to the formation of the tester or holder from netting or other material having apertures throughout its surface, the surface of the inflated tube is exposed to view and to the escape of air at any point or points on the tube's surface, so that a leak is readily accurately detected. By the construction and arrangement of the inner and outer, concentric and opposed sections 11 and 12, with the space there between formed by the securing hooks, the surface of the tube is in nowise materially covered up, and those portions of the tube where leaks of the character to which the invention is mainly directed, generally occur is exposed by and through the meshes of the netting material 14 of which the casing or holder is preferably formed.

A modified form and arrangement of the tube tester embodying the invention is presented by Figs. 4 and 5 of the accompanying drawings, in which the casing or holder $10^1$ is formed of and as a single section $12^1$ of the wire netting 14. In this form of the invention, the casing $10^1$ is of the usual annular form substantially circular or tubular in cross section, but having the inner side or circumference thereof open, and the edges at the open side provided with the beads or rings $15^1$. A series of fastening elements or hooks $17^1$ are pivotally mounted, preferably for outward swinging, although not so limited, at spaced intervals to and along one of the beads or rings $15^1$ for swinging across and engagement with the opposite bead $15^1$ to secure the casing in the tube holding and retaining position. In order to open the casing and remove a tube therefrom, the hooks $17^1$ are disengaged and swung to open position, whereupon the tube, by either deflating the same, or spreading the edges of the casing $10^1$, can be readily removed. A tube is inserted for testing in the casing in a similar manner. The operation and use of the form of tube tester described above is similar to that explained with reference to Figs. 1 to 3, and will be readily understood therefrom.

By the invention, the difficulties encountered in detecting and locating small, minute punctures or leaks in inner-tubes, are eliminated as it is possible by the use of the tester to inflate a tube without danger of bursting or bulging the same, to the required high pressure. Although primarily intended for locating small punctures in inner-tubes, it is also efficient for locating and detecting any and all leaks, not only in the inner-tubes of tires, but tubes generally, if so desired. The provision by the invention of the side openings formed by the swingably mounted fastening members in closed position maintaining the opposite edges of the casing spaced apart, enables such opening to be disposed in such relation to a tube mounted in the casing as to substantially totally expose that portion of the tube in which minute leaks may generally occur, while the tube is retained by the fastening members, which are of such relatively small width that no appreciable surface of the tube is covered and are so spaced apart as to prevent any tendency of the tube to bulge or expand therebetween under the required testing pressures. As an example, in certain types of tubes, the inner side thereof is subjected to rust from the rim and other causes of rubber deterioration and rot, with the result that frequently very minute leaks develop which are difficult of detection for reasons previously referred to, and with tubes of these types the tester in the form of Figs. 4 and 5 is particularly efficient, due to the open inner side and the practically complete exposure of the inner side of the tube for inspection and testing. Further, by mounting the fastening members for outward swinging, it is possible to quickly disengage them for swinging to casing opening position without interference from the partially inflated tube, and without deflating the tube, as well as permitting ready unhampered insertion of a tube with the members swung outwardly to open position.

While in the examples hereof, the holders or casings of the tester are shown and described as formed of wire netting to provide relatively stiff, shape holding structures, the invention is not so limited, but includes and contemplates the use of fabric netting which is held in shape by an inflated tube inserted therein and collapses upon removal of a tube. With the fabric netting type of holder it is possible to readily store and transport the same in a small space which renders such type particularly adapted for use as equipment on a motor vehicle. Attention is here further directed to the fact that other characters of material than netting can be employed to secure the same or equivalent operation and results, such for example as any suitable reticulated material.

It is also evident that various other changes, variations, substitutions and modifications might be resorted to without departing from the spirit and scope of my invention, and hence I do not desire to limit my invention to the exact and specific disclosures hereof.

Desiring to protect my invention in the broadest manner legally possible, what I claim and desire to secure by Letters Patent of the United States, is:

1. A tube tester embodying an annular casing formed of reticulated material and having an open inner side extending completely therearound, bead members secured to the casing along opposite edges of the open inner side thereof, and outwardly swingable fastening and spacing members carried by one of said bead members at spaced intervals therearound for releasably engaging the opposite bead member to maintain the casing edges spaced apart in substantially fixed relation and confine a tube within the casing while substantially completely exposing the surface of the tube disposed at and around the inner side of the tube.

2. A tube tester embodying an annular tubular casing formed with a side opening therethrough extending completely therearound, and fastening and spacing members swingably mounted at spaced intervals on and around the casing adjacent one side opening edge thereof for extending across the opening and releasably engaging the casing adjacent the opposite edge, said members in engaged position securing the casing edges in spaced opening forming relation to confine a tube in the casing while substantially completely exposing the surface of the tube disposed at and around the open side of the casing.

Signed at Richmond, Virginia, this 22nd day of November, 1926.

GEORGE E. MANCOS.